United States Patent [19]

Gupta et al.

[11] Patent Number: 5,109,101
[45] Date of Patent: Apr. 28, 1992

[54] PROCESS FOR MAKING POLYARYLATE COMPOSITIONS HAVING IMPROVED PROPERTIES

[75] Inventors: Balaram Gupta; Gordon W. Calundann, both of North Plainfield, N.J.

[73] Assignee: Hoechst Celanse Corp., Somerville, N.J.

[21] Appl. No.: 645,084

[22] Filed: Jan. 23, 1991

Related U.S. Application Data

[62] Division of Ser. No. 433,231, Nov. 7, 1989, Pat. No. 5,023,314.

[51] Int. Cl.$^5$ .................. C08G 63/02; C08G 63/18; C08G 63/00
[52] U.S. Cl. .................... 528/190; 528/176; 528/193; 528/271; 528/272
[58] Field of Search ............... 528/125, 171, 193, 194, 528/191, 190, 192, 271, 272

[56] References Cited

U.S. PATENT DOCUMENTS

| | | | |
|---|---|---|---|
| 3,884,990 | 5/1975 | Sakata et al. | 525/448 |
| 3,946,091 | 3/1976 | Sakata et al. | 525/444 |
| 4,318,842 | 3/1982 | East et al. | 528/190 |
| 4,421,908 | 12/1983 | East | 528/181 |
| 4,444,960 | 4/1984 | Salee et al. | 525/534 |
| 4,560,740 | 12/1985 | Ueno et al. | 528/125 |
| 4,664,972 | 5/1987 | Connolly | 428/290 |
| 4,684,712 | 8/1987 | Ueno et al. | 528/190 |
| 4,717,624 | 1/1988 | Ikenaga et al. | 428/423.1 |
| 4,719,280 | 1/1988 | Irwin | 528/194 |
| 4,746,694 | 5/1988 | Charbonneau | 528/176 |

Primary Examiner—John Kight, III
Assistant Examiner—T. Mosley
Attorney, Agent, or Firm—J. M. Hunter, Jr.

[57] ABSTRACT

Thermoplastic polyarylate compositions suitable for molding are formed from isophthalic acid, terephthalic acid or mixtures thereof, a bisphenolic compound such as bisphenol A and from about 5 to 10 mole % relative to the monomeric charge of 2-hydroxy-6-naphthoic acid.

13 Claims, No Drawings

PROCESS FOR MAKING POLYARYLATE COMPOSITIONS HAVING IMPROVED PROPERTIES

This is a divisional of copending application Ser. No. 07/433,231 filed on Nov. 7, 1989 now U.S. Pat. No. 5,023,314 issued Jun. 11, 1991.

BACKGROUND OF THE INVENTION

The present invention is directed to novel isotropic aromatic polyesters, i.e. polyarylates.

Linear aromatic polyesters prepared from dicarboxylic acids, especially from aromatic dicarboxylic acids and bisphenols are well known for their suitability for molding, extrusion, casting, and film-forming applications. For example, U.S. Pat. No. 3,216,970 to Conix, discloses linear aromatic polyesters prepared from isophthalic acid, terephthalic acid, and a bisphenolic compound. Such high molecular weight compositions are known to be useful in the preparation of various films and fibers. Further, these compositions, when molded into useful articles using conventional techniques, provide properties superior to articles molded from other linear polyester compositions. For instance, aromatic polyesters are known to have a variety of useful properties, such as good tensile, impact, and bending strengths, high thermal deformation and thermal decomposition temperatures, resistance to UV irradiation and good electrical properties.

It is known to impart desired physical properties to polyarylate resins by the inclusion of additives. However, the inclusion of additives to polyarylate obviously increases the expense of such compositions above the polyarylate resin itself. Moreover, often while improving one physical property, the additives may degrade another property inherent in the polyarylate resin. Accordingly, it would be worthwhile to improve the inherent properties of the polyarylate without resorting to the excessive addition of modifying substances.

In forming polyarylates, in general, it is necessary to conduct the polymerization in two stages. In the first stage, a prepolymer is formed typically having an intrinsic viscosity of up to 0.3 dl/g. The prepolymer is formed by condensing the aromatic dicarboxylic acid components with the bisphenolic compound. In the second stage, polycondensation takes place resulting in an aromatic polyester having an I.V. of greater than 0.4 dl/g. While the two-step process has proven useful to yield acceptable polymeric materials, it would be worthwhile to prepare a polyarylate in one step providing polyesters of intrinsic viscosity of greater than 0.4 dl/g without resorting to the prepolymer/post polymerization two-stage process.

The primary objectives of the present invention are to produce a polyarylate having inherently improved properties and to form the aromatic polyesters in only one step and still provide the polyesters with sufficiently high molecular weight.

SUMMARY OF THE INVENTION

It has now been found that novel polyarylates can be made from isophthalic acid and/or terephthalic acid, a bisphenolic compound and from about 5 to about 10 mol % of 2-hydroxy-6-naphthoic acid (HNA). Such polyarylates are optically transparent and substantially tougher than the corresponding polyarylates formed without the addition of 2-hydroxy-6-naphthoic acid.

Further, it has been found that high molecular weight polyarylates can be prepared from the above monomers in one step. Thus, polyarylates formed with 5 to 10 mol % HNA can be prepared in one step with intrinsic viscosities of greater than 0.4 dl/g and with glass transition temperatures greater than those found in polyarylates which have been formed without HNA.

DETAILED DESCRIPTION OF THE INVENTION

The isotropic aromatic polyesters of this invention are obtained from terephthalic acid and/or isophthalic acid and/or functional derivatives thereof and a bisphenol of the following general formula (I)

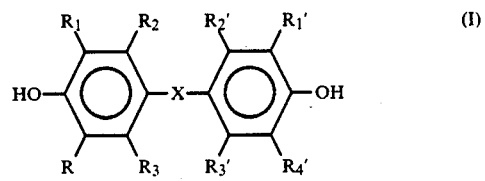

wherein —X— is selected from the group consisting of —O—, —S—, —SO$_2$—, —SO—, —CO—, an alkylene group containing 1 to 4 carbon atoms, and an alkylidene group containing 1 to 4 carbon atoms, and $R_1$, $R_2$, $R_3$, $R_4$, $R_1'$, $R_2'$, $R_3'$, and $R_4'$, which may be the same or different, each is selected from the group consisting of a hydrogen atom, a chlorine atom, a bromine atom and an alkyl group containing 1 to 4 carbon atoms, or functional derivatives thereof.

The bisphenolic compounds that may be used in this invention include but are not limited to the following:
2,2-bis-(4-hydroxyphenyl)propane,
2,2-bis-(4-hydroxyphenyl)hexafluoropropane
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)ethane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxyphenyl)pentane,
3,3-bis-(4-hydroxyphenyl)pentane,
2,2-bis-(4-hydroxyphenyl)heptane,
1,2-bis-(4-hydroxyphenyl)-1,2-bis-(phenyl)-propane,
4,4'-(dihydroxyphenyl)ether,
4,4'-(dihydroxyphenyl)sulfide,
4,4'-(dihydroxyphenyl)sulfone,
4,4'-(dihydroxyphenyl)sulfoxide,
4,4'-(dihydroxybenzophenone),
hydroquinone, and
naphthalene diols.

These bisphenolic compounds may be used individually or in any combination. It is also possible to add up to 50 wt. % based on the total diol content of aliphatic diols, such as neopentyl glycol. The preferred bisphenolic compound is 2,2-bis(4-hydroxyphenyl)propane (bisphenol-A).

A mixture of terephthalic and isophthalic acid are preferably used to form the polyarylates of this invention. Typically, about 90 to about 10 mole % of terephthalic acid and/or a functional derivative thereof and about 10 to about 90 mole % of isophthalic acid and/or a functional derivative thereof is preferred for use as the acid component to be reacted with the bisphenol to prepare the aromatic polyester as referred to in this invention. Preferably, a mixture of 20 to 80 mole % of terephthalic acid and/or a functional derivative thereof and 80 to 20 mole % of isophthalic acid and/or a functional derivative thereof is used. Most preferably, a mixture of 70 to 80 mole % isophthalic acid and 20–30 mole % terephthalic acid is used. The molar ratio of bisphenol to the sum of the terephthalic acid units and isophthalic acid units is substantially equimolar.

Suitable functional derivatives of terephthalic or isophthalic acid which can be used include acid halides, dialkyl esters and diaryl esters. Preferred examples of acid halides include terephthaloyl dichloride, isophthaloyl dichloride, terephthaloyl dibromide and isophthaloyl dibromide. Preferred examples of dialkyl esters include dialkyl esters of terephthalic and isophthalic acids containing 1 to 6 (especially 1 to 2) carbon atoms in each alkyl moiety thereof. Preferred examples of diaryl esters include diphenyl terephthalate and diphenyl isophthalate.

Typical examples of functional derivatives of bisphenols which can be used are the metal salts thereof and the diesters thereof with aliphatic monocarboxylic acids containing 1 to 3 carbon atoms. Preferred functional derivatives of the bisphenols are the sodium salts, the potassium salts, and the diacetate esters thereof. The bisphenols may be used either alone or as a mixture of two or more thereof.

A more extensive list of bisphenols and dicarboxylic acid components for producing the polyarylates of this invention are described in U.S. Pat. No. 4,444,960, which patent is herein incorporated by reference. The derivatives of the bisphenolic compound and aromatic dicarboxylic acids used will depend on the reaction procedure which is used to form the polyarylates.

Examples of the derivatives of 2-hydroxynaphthalene-6-carboxylic acid include compounds resulting from the bonding of a halogen atom, a lower alkyl group or a lower alkoxy group to the aromatic ring of 2-hydroxynaphthalene-6-carboxylic acid, and compounds resulting from derivatizing the hydroxyl and/or carboxyl group of 2-hydroxynaphthalene-6-carboxylic acid in the manner in which the bisphenolic compound and aromatic dicarboxylic acid may be derivatized as stated immediately above. The HNA is added in amounts of about 5 to 10 mole % relative to the total monomeric content.

Any known method can be used to produce the aromatic polyesters of this invention. Thus, the interfacial polymerization method which comprises mixing a solution of an aromatic dicarboxylic acid chloride in a water-immiscible organic solvent with an alkaline aqueous solution of bisphenol, the solution polymerization method which comprises heating a bisphenol and an acid chloride in an organic solvent, and the melt polymerization method which comprises heating a phenyl ester of an aromatic dicarboxylic acid and bisphenol, all of which are described in detail in U.S. Pat. Nos. 3,884,990, and 3,946,091, and can, for example, be employed.

While many processes have been described in the literature for the preparation of polyarylates, the preferred process is the diacetate process. In the diacetate process, the dihydric phenol is converted to its diacetate, which is then reacted with the aromatic dicarboxylic acid(s) and HNA to form the polyarylate. The hydroxyl group of the HNA may be converted to the acetate.

The diester derivative of the dihydric phenol is prepared by reacting a dihydric phenol with an acid anhydride derived from acids containing from 1 to 8 carbon atoms under conventional esterification conditions. The preferred acid anhydride is acetic anhydride. Although the diester derivative of the dihydric phenol can be formed prior to reaction with the aromatic dicarboxylic acid, it is preferred to perform the reaction in one vessel in which the aromatic dicarboxylic acid, dihydric phenol, HNA and acid anhydride are added simultaneously.

The reaction of the diester derivative of a dihydric phenol with the aromatic dicarboxylic acid and HNA is preferably carried out in a solvent which is present in amounts of from about 10 to about 60, preferably from about 10 to about 40, and most preferably, from about 10 to about 30 weight percent, based on the weight of the total charge. A preferred solvent comprises a diphenyl ether (also known as diphenyl oxide) compound. The diphenyl ether compound may be substituted. These substituents are selected from alkyl groups, chlorine, bromine or any substituent which does not interfere with the polyarylate forming reaction or the reaction forming the diester derivative of the dihydric phenol. Additionally, the diphenyl ether compound may be used with up to 50 weight percent of other compounds, such as various biphenyls or any other compounds which do not interfere with the polyarylate forming reaction or the reaction forming the diester derivative of the dihydric phenol. A preferred solvent comprises a eutectic mixture of diphenyl oxide and biphenyl, which solvent is a liquid at room temperature.

The amount of the diphenyl ether compound could vary during the polymerization reaction. For example, it may be advantageous to increase progressively the amount of diphenyl ether compound to maintain the reaction medium at about constant viscosity. The presence of a solvent at the end of polymerization is also useful since the formed polymer may be suitably end-capped in solution and subsequently recovered by any known non-reactive devolatilization process.

The reaction of the diester derivative of the dihydric phenol with the aromatic dicarboxylic acid and 5 to 10 mole % HNA is performed with the diester and acid reactants present in a diester/acid ratio of from about 0.85–1.10 and, preferably, from about 0.97–1.03 to provide an intrinsic viscosity of at least 0.4 dl/g.

The process of this invention is carried out at a polymerization temperature of from about 200° to about 350° C. and preferably, from about 275° to about 305° C. The present process is generally conducted in an inert atmosphere (such as argon or nitrogen). It is desirable to maintain the reaction temperature as low as possible to prevent the coloration of polymer while as high a reaction temperature as possible is preferred in terms of the rate of reaction. The process is initially carried out at atmospheric pressure or super atmospheric pressure and the pressure is reduced as polymerization proceeds. Near the end of polymerization, pressure as low as 0.5 torr absolute may be used.

Catalysts are used to accelerate the rate of polymerization. All the conventional catalysts being capable of accelerating an ester exchange reaction are usable. Suitable examples of catalysts are salts or compounds of elements selected from Groups 1A, 2A, 2B, 3A, 4A and 5A of the periodic table of elements. Examples include metal oxides (e.g., magnesium oxide, lead oxide, zinc oxide, antimony trioxide); alkoxides which are prepared by the reaction of an alcohol or glycol and an alkali metal, alkaline earth metal, aluminum or titanium; sodium acetate and sodium benzoate; metal hydrides and metal borohydrides (e.g., lithium hydride, potassium borohydride ($K_2B_2H_6$). The preferred catalyst is an alkali metal salt and most preferred are lithium and potassium salts including the acetates, carbonates, benzoates, formates, bicarbonates, hydroxides, phosphates and monohydrogen phosphates of lithium or potassium. The lithium salts are especially preferred including lithium acetate, carbonate and hydroxide. The catalyst is added in amounts between about 5–100 ppm based on polymer, preferably about 20–50 ppm, and most preferably about 25 ppm.

An adjunct catalyst may also be used. Examples include the imidazole catalysts disclosed in U.S. Pat. No. 4,612,360 herein incorporated by reference. Specific examples include 1-methylimidazole, 1-ethylimidazole, 2-ethyl-4-methylimidazole, and benzimidazole.

A cobalt salt may be added to the reaction medium along with the esterification catalyst, to act as cocatalyst and as well to yield a polyarylate of improved color, in particular, improved Hunter b color in which the yellowness of the polyarylate is substantially reduced. The improved polyarylate color by addition of cobalt found in polyarylates formed by the "diacetate process" is disclosed in U.S. Ser. No. 356,692, filed May 25, 1989. Cobalt has also been found to improve polyarylate color using the melt transesterification process as described in U.S. Ser. No. 068,163, filed Jun. 30, 1987. Any cobalt salt may be used as the cocatalyst to improve polyarylate color including but not limited to cobalt acetate, cobalt benzoate, cobalt carbonate, cobalt phenate, and the cobalt salt of an aliphatic or isoaliphatic acid which contains 3 to 20 carbon atoms, such as cobalt 2-ethylhexanoate. The cobalt salt can be added directly to the monomeric components or, more preferably, to insure solubility and uniform dispersion of the cobalt salt, the cobalt salt can be dissolved in a solvent prior to addition. Any conventional solvent may be used. In general, the cobalt salt should be added in sufficient amounts to yield at least about 20 ppm, preferably at least 25 ppm of cobalt in the final polymer. Below these levels, some color improvement has been found although water white color is not achieved. More preferably, the amount of cobalt should range from about 30 ppm to 60 ppm based on the final polymer. Preferred polyarylate color has a value of less than 2.0 on the Hunter b scale.

The polymerization reaction is conducted for a period of time sufficient to produce a polyarylate having an intrinsic viscosity of at least about 0.4 to greater than 1.0 dl/gm, which time is generally in the range of from about 4 hours to about 8 hours, depending on the particular polyarylate being prepared.

The polymerization reaction of this invention may be carried out batchwise or continuously by using appropriate staging and by using suitable apparatus. Moreover, the reactants may be added to the polymerization zone in any way or order desired.

The diester derivative of the dihydric phenol may be formed in situ by adding the dihydric phenol together with the acid anhydride, an aromatic dicarboxylic acid(s), HNA and, optionally a solvent such as diphenyl ether compound to the reactor and the reaction carried out in a single reaction zone under combined esterification and polymerization conditions as described above. Additionally, the diester derivative of the dihydric phenol may be first prepared and then an aromatic dicarboxylic acid, HNA and a diphenyl ether compound added directly to the same reaction vessel with the polymerization being carried out under the conditions described above.

The polyarylate polymer having an intrinsic viscosity of at least about 0.4 dl/g is recovered in its final form by methods well known to those in the art, such as by direct devolatilization in an extruder under conditions sufficient to remove the diphenyl ether compound, coagulation, spray drying, and the like.

The polyarylates may also, if desired, be prepared by first forming a polyarylate prepolymer having an intrinsic viscosity of from about 0.1 to about 0.3 dl/gm, by reacting the diester derivative of a dihydric phenol with an aromatic dicarboxylic acid and HNA under the conditions described previously, for a reaction time of about 3 hours. Under batch conditions, the polyarylate prepolymer is then heated at temperatures of from about 275°–305° C. to obtain a polyarylate having an intrinsic viscosity of from about 0.45 to greater than 1.0 dl/gm.

Alternatively, the polyarylate prepolymer may be added directly, after its formation, to a vented extruder wherein the molecular weight is increased to form a polymer having an intrinsic viscosity of from about 0.45 to greater than about 1.0 dl/gm. For example, the molecular weight of a polyarylate prepolymer is increased in the extruder at a temperature of from about 320° to about 360° C., under pressure of about 0.3 to about 2 torr and a residence time of from about 5 to about 30 minutes.

The process of this invention produces normally solid polyarylates having an intrinsic viscosity of from about 0.4 to greater than about 1.0, preferably from about 0.45 to 0.70 dl/gm, as measured in 1,1,2,2-tetrachloroethane at 30° C. It has been found that as the intrinsic viscosity increases beyond the preferred levels, the color of the polyarylate becomes less acceptable.

The polyarylates may be prepared in the presence of materials such as molecular weight regulators, antioxidants, and the like. The polyarylates obtained by the process of this invention may be used together with the well-known additives such as plasticizers, pigments, lubricating agents, mold release agents, stabilizers, inorganic fillers, and the like. These polyarylates may also be blended with other polymers.

Inorganic fillers which can be added to the polyarylates of the present invention include various kinds of finely divided particulate and fibrous materials exemplified by siliceous fillers such as silica, quartz, diatomaceous earth, metal oxides, metal carbonates, inorganic fibers, such as asbestos, glass fibers, carbon fibers and particulate materials such as glass beads, clay, powdered mica, talc, graphite flake and minerals such as wollastonite. It is sometimes advantageous that the surface or the organic fillers be treated in advance with a coupling agent such as certain kinds of organosilanes and the like. The filler materials can be used in amounts ranging from about 15 to 50% by weight based on the total weight of the composition including polymer and filler materials.

The polyarylate compositions of the present invention whether filled or nonfilled have use in molding many kinds of articles including sheets, films and, as well, can be spun into fibers. The polyesters of this invention are thermoplastic materials useful as molding compositions. Moreover, the polyarylates as described herein are isotropic and, thus, do not exhibit an anisotropic melt phase.

The following examples are for the purpose for illustrating the invention and should not be construed so as to unduly restrict the invention to the specific embodiments shown.

EXAMPLE 1

A polyarylate was formed by reacting the following materials:

| | Mole % of Charge |
|---|---|
| 39.4 g (.0237 mole) Terephthalic acid | 11.875 |
| 18.8 g (0.100 mole) HNA | 5.0 |
| 216.7 g (0.950 mole) Bisphenol A | 47.52 |
| 118.3 g (0.713 mole) Isophthalic acid | 35.625 |
| 215.0 g Dowtherm-A[1] | |
| 0.8 ml Lithium hydroxide solution | |
| (3.1 g of lithium hydroxide monohydrate dissolved in 100 ml of acetic acid) | |
| 0.8 ml Cobalt acetate solution | |
| (3.56 g of cobalt tetrahydrate dissolved in 100 ml of acetic acid) | |
| 213.6 g Acetic anhydride | |

[1] A mixture of diphenol oxide and biphenol from Dow Chemical Co.

The dry solids were charged to a one liter flask under $N_2$ and dried at 100° C. in approximately 0.08 torr absolute pressure for 1 hour.

The remaining material was charged and the mixture heated at a rate of 0.67°-2° C./minute to 300° C. with stirring at approximately 75 rpm. Acetic acid began distilling before the temperature reached about 200° C. and about half the theoretical acetic acid was distilled off before 250° C., the result of bisphenol A acetylation. At 300° C., the pressure was reduced over a period of 30–40 minutes to 0.7 torr. Dowtherm A (bp) approximately 255° C., 1 atmosphere) stripped off during the run with the rest of the acetic acid of reaction and was absent in the reactor by the end of the run. After 2.25 hours at 300° C. and low pressure, the vacuum was broken and the polymer was removed yielding 299.7 g, representing an 83.8% yield. The polymer had a green tint, a $T_g$ of 173.3° C. and I.V. equal to 0.34.

EXAMPLE 2

Example 1 was repeated. 318 g of polymer was recovered which represents an 89% yield. The $T_g$ was 180.2° C. and the polymer had an I.V. of 0.34. The weight average ($M_w$), number average ($M_n$) molecular weight and molecular weight distribution were determined to be respectively 3,100; 1,200 and 2.5 by GPC.

EXAMPLE 3

A polyarylate was formed by reacting the following materials.

| | Mole % of Charge |
|---|---|
| 112.1 g (0.675 mole) Isophthalic acid | 33.75 |
| 37.4 g (0.225 mole) Terephthalic acid | 11.25 |
| 37.6 g (0.200 mole) HNA | 10.0 |
| 206.1 g (0.904 mole) Bisphenol A | 45.20 |
| 215.0 g Dowtherm-A[1] | |
| 0.8 ml Lithium hydroxide solution | |

| | Mole % of Charge |
|---|---|
| (3.1 g of lithium hydroxide monohydrate dissolved in 100 ml of acetic acid.) | |
| 0.8 ml Cobalt acetate solution | |
| (3.1 g of cobalt acetate tetrahydrate dissolved in 100 ml of acetic acid) | |
| 213.6 g Acetic anhydride | |

The same procedure as in Examples 1 and 2 was utilized. 355.7 g of polymer was recovered. The polymer had a $T_g$ of 182.5° C. and I.V. of 0.44. The melt viscosity of the product at 320° C. was 13,907 poise at a shear rate of 100 sec$^{-1}$, and 6,343 poise at a shear rate of 1,000 sec$^{-1}$.

EXAMPLE 4

Example 3 was repeated. 354.7 g of polymer was recovered. The polymer had a $T_g$ of 184° C. and I.V. of 0.46. The melt viscosity of the product at 320° C. was 9,309 poise at a shear rate of 100 sec$^{-1}$, and 5,077 poise at a shear rate of 1,000 sec$^{-1}$. The weight average ($M_w$), and number average ($M_n$) molecular weights were determined to be 16,000 and 6,000 respectively, and the molecular weight distribution (MWD) was 2.7. The molecular weight was measured by GPC.

While at a temperature of 340° to 370° C., the molten product was extruded through a single hole spinneret (0.005 in. diameter×0.007 in.) at a throughput rate of 0.4 gram/minute. The resulting as-spun filament was quenched in ambient air (25° C. and 65% relative humidity) prior to windup at a speed of 350 to 600 meters/minute. The as-spun fiber properties were: 0.8 g/d tenacity; 99% elongation; 18.3 g/d initial modulus; and 26.64 denier/fil.

EXAMPLE 5

A polyarylate was formed by reacting the following materials.

| | Mole % of Charge |
|---|---|
| 473.5 g (2.85 mole) Isophthalic acid | 35.625 |
| 157.8 g (0.95 mole) Terephthalic acid | 11.875 |
| 867.5 g (3.8 mole) Bisphenol A | 47.5 |
| 75.3 g (0.4 mole) HNA | 5.0 |
| 100.0 g Dowtherm-A | |

3.8 ml Lithium hydroxide solution (3.1 g of lithium hydroxide monohydrate dissolved in 100 ml of glacial acetic acid)

3.5 ml Cobalt acetate solution (3.56 g of cobalt acetate tetrahydrate dissolved in 100 ml of glacial acetic acid)

854.2 g Acetic anhydride

The same polymerization procedure as in the above Examples was utilized. 1,188.7 g of polymer was recovered which represents an 83% yield. The $T_g$ was 179.9° C. and the polyarylate had an I.V. of 0.54. The melt viscosity of the product at 320° C. was 13,172 poise at a shear rate of 100 sec$^{-1}$, and 5,668 poise at a shear rate of 2,000 sec$^{-1}$.

The polymer was injection molded neat to form standard test bars while using a barrel temperature of 320° C. and a mold temperature of 120° C. Tensile tests were performed in accordance with ASTM D638, flexural tests with ASTM D790, Notched Izod impact tests were performed in accordance with ASTM D256, and heat-deflection testing was performed in accordance with ASTM D648. The results were as follows Tensile strength at yield 10.97 Kpsi; tensile strength at break 9.32 Kpsi; tensile modulus 0.3 Mpsi; tensile elongation 7.99%; flexural strength at 5% strain 13.05 Kpsi; flexural modulus 0.33 Mpsi; Notched Izod impact strength 1.61 ft-lb/in. and HDT at 264 psi 152° C.

EXAMPLE 6

Example 5 was repeated. 1,193.7 g of polymer was recovered which represents an 83.4% yield. The $T_g$ was 180° C. and the product had an I.V. of 0.48. The melt viscosity of the product at 320° C. was 12,333 poise at a shear rate of 100 sec$^{-1}$, and 5,335 poise at a shear rate of 1,000 sec$^{-1}$.

The polymer was injection molded neat to form standard test bars while using a barrel temperature of 320° C. and a mold temperature of 120° C. The results of testing as in Example 5 were as follows: tensile strength at break 5 Kpsi; tensile modulus 0.31 Mpsi; tensile elongation 1.73%; flexural strength at 5% strain 13.06 Kpsi; flexural modulus 0.34 Mpsi; Notched Izod impact strength 1.5 ft-lb/in. and HDT at 264 psi 149° C. The rockwell hardness was measured in accordance with ASTM D785 and was found to be 93 on M scale. The rockwell hardness of this material is higher than a typical polyarylate formed without HNA and having an I.V. of 0.6 which has a rockwell hardness of about around 85 on M scale.

EXAMPLE 7

Example 5 was repeated. 1,203.9 g of polymer was recovered which represents an 84% yield. The $T_g$ was 178° C. and the polymer had an I.V. of 0.61. The melt viscosity of the product at 320° C. was 10,639 poise at a shear rate of 100 sec$^{-1}$ and 4,807 poise at a shear rate of 1000 sec$^{-1}$.

The polymer was compounded while molten with 30 percent by weight of chopped glass reinforcing fibers based upon the total weight of the polymer and fibers to form a molding composition. The molding composition was injection molded to form standard test bars while using a barrel temperature of 320° C. and a mold temperature of 120° C. Tensile tests were performed in accordance with ASTM as described above. The results were as follows: Tensile strength at break 18.27 Kpsi; tensile modulus 1.2 Mpsi; tensile elongation 2.3%; flexural strength 26.55 Kpsi; flexural modulus 1.14 Mpsi; Notched Izod impact strength 1.32 ft-lb/in. and HDT at 264 psi 171° C.

EXAMPLE 8

Example 5 was repeated. 1,118.4 g of polymer was recovered which represents an 78% yield. The $T_g$ was 179° C. and the polymer had an I.V. of 0.43. The melt viscosity of the product at 320° C. was 7,359 poise at a shear rate of 100 sec$^{-1}$, and 4,328 poise at a shear rate of 1000 sec$^{-1}$.

The polymer was compounded while molten with 30 percent by weight of chopped glass reinforcing fibers based upon the total weight of the composition. The molding composition was injection molded to form standard test bars while using a barrel temperature of 320° C. and a mold temperature of 120° C. Tests were performed as described above. The results were as follows: Tensile strength at break 18.12 Kpsi; tensile modulus 1.2 Mpsi; tensile elongation 2.4%; flexural strength 27.33 Kpsi; flexural modulus 1.17 Mpsi; Notched Izod impact strength 1.36 ft-lb/in. and HDT at 264 psi 171° C.

EXAMPLE 9

A polyarylate was formed by reacting the following materials.

|  | Mole % of Charge |
| --- | --- |
| 448.6 g (2.7 mole) Isophthalic acid | 33.75 |
| 149.5 g (0.9 mole) Terephthalic acid | 11.25 |
| 825.5 g (3.616 mole) Bisphenol A | 45.2 |
| 150.7 g (0.8 mole) HNA | 10.0 |
| 100.0 g Dowtherm-A |  |

3.8 ml Lithium hydroxide solution (3.1 g of lithium hydroxide monohydrate dissolved in 100 ml of glacial acetic acid)

3.5 ml Cobalt acetate solution (3.56g of cobalt acetate tetrahydrate dissolved in 100 ml of glacial acetic acid)

854.2 g Acetic anhydride

The same procedure as in the above Examples was utilized to form the polyarylate. 1,125.7 g of polymer was recovered which represents an 78.7% yield. The $T_g$ was 185° C. and the polymer had an I.V. of 0.43. The melt viscosity of the product at 320° C. was 10,699 poise at a shear rate of 100 sec$^{-1}$, and 5,153 poise at a shear rate of 1,000 sec$^{-1}$.

The polymer was injection molded neat to form standard test bars while using a barrel temperature of 320° C. and a mold temperature of 120° C. Results of testing are as follows: Tensile strength at break 5.11 Kpsi; tensile modulus 0.31 Mpsi; tensile elongation 1.75%; flexural strength at 5% strain 12.77 Kpsi; flexural strength 11.35 Kpsi; flexural modulus 0.33 Mpsi; Notched Izod impact strength 1.47 ft-lb/in. and HDT at 264 psi 146° C. The rockwell hardness was measured in accordance with ASTM D785 and was found to be 95 on M scale.

EXAMPLE 10

Example 9 was repeated. 1,098.6 g of polymer was recovered which represents an 76.8% yield. The $T_g$ was 182.5° C. and the polymer had an I.V. of 0.43. The melt viscosity of the product at 320° C. was 8,906 poise at a shear rate of 100 sec$^{-1}$, and 4,011 poise at a shear rate of 1,000 sec$^{-1}$.

The polymer was compounded while molten with 30 percent by weight of chopped glass reinforcing fibers based upon the total weight of the product and the fibers to form a molding composition. The molding composition was injection molded to form standard test bars while using a barrel temperature of 320° C. and a mold temperature of 120° C. Results of testing was as follows: Tensile strength at break 17.41 Kpsi; tensile modulus 1.13 Mpsi; tensile elongation 2.24%; flexural strength 25.5 Kpsi; flexural modulus 1.1 Mpsi; Notched Izod impact strength 1.3 ft-lb/in. and HDT at 264 psi 171° C.

What is claimed is:

1. A process for producing a novel isotropic polyarylate comprising polycondensing monomeric materials consisting essentially of (a) an aromatic dicarboxylic acid selected from the group consisting of terephthalic acid, isophthalic acid, mixtures thereof and the aromatic polyester-forming derivatives thereof; (b) a bisphenolic compound and the aromatic polyester-forming derivatives thereof; and (c) about 5 to about 10 mole % based on the total amount of the monomeric materials of 2-hydroxy-6-naphthoic acid or an aromatic polyester-forming derivative thereof.

2. The process of claim 1 wherein said aromatic dicarboxylic acid comprises a mixture of isophthalic acid and terephthalic acid or the aromatic polyester-forming derivatives thereof.

3. The process of claim 2 wherein said mixture comprises 70 to 80 mole % isophthalic acid or aromatic polyester-forming derivative thereof and 20 to 30 mole % terephthalic acid or the aromatic polyester-forming derivative thereof.

4. The process of claim 1 wherein said bisphenolic compound is bisphenol A.

5. The process of claim 3 wherein said bisphenolic compound is bisphenol A.

6. The process of claim 1 wherein said bisphenolic compound is in the form of the diacetate thereof.

7. The process of claim 6 wherein said diacetate is formed in situ during the polycondensation by the incorporation of acetic anhydride with the monomeric components.

8. The process of claim 7 wherein said bisphenolic compound is bisphenol A.

9. The process of claim 1 wherein said polyarylate is formed in one step and a polyarylate having an intrinsic viscosity of at least about 0.4 dl/g as measured in 1,1,2,2,tetrachloroethane at 30° C. is recovered.

10. The process of claim 6 wherein said polycondensation takes place in the presence of a solvent.

11. The process of claim 6 wherein said polycondensation takes place in the presence of an alkali metal-containing catalyst.

12. The process of claim 11 further including from about 20 ppm to 60 ppm of a cobalt-containing cocatalyst.

13. The process of claim 12 wherein said polyarylate is formed in one step and a polyarylate having an intrinsic viscosity of at least about 0.4 dl/g as measured in 1,1,2,2,tetrachloroethane at 30° C. is recovered.

* * * * *